US010547648B2

(12) United States Patent
Shmueli et al.

(10) Patent No.: US 10,547,648 B2
(45) Date of Patent: *Jan. 28, 2020

(54) ROUTING OF DATA INCLUDING MULTIMEDIA BETWEEN ELECTRONIC DEVICES

(71) Applicants: Oded Shmueli, Nofit (IL); Benny Yehezkel, Ramat-Gan (IL)

(72) Inventors: Oded Shmueli, Nofit (IL); Benny Yehezkel, Ramat-Gan (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/607,729

(22) Filed: May 30, 2017

(65) Prior Publication Data
US 2017/0264479 A1    Sep. 14, 2017

Related U.S. Application Data

(63) Continuation of application No. 14/201,870, filed on Mar. 9, 2014, now Pat. No. 9,699,223, which is a (Continued)

(51) Int. Cl.
*H04L 29/06* (2006.01)
*H04M 3/42* (2006.01)
(Continued)

(52) U.S. Cl.
CPC .... *H04L 65/1069* (2013.01); *H04L 29/06027* (2013.01); *H04L 65/60* (2013.01);
(Continued)

(58) Field of Classification Search
CPC ................. H04L 63/0428; H04L 67/04; H04L 29/06027; H04L 65/60; H04M 1/006;
(Continued)

(56) References Cited

U.S. PATENT DOCUMENTS 5,854,834 A    12/1998 Gottlieb et al.
5,913,038 A     6/1999 Griffiths
(Continued)

FOREIGN PATENT DOCUMENTS

GB          2370451       6/2002
WO       WO 01/41317      6/2001
WO     WO 2004/012026     2/2004

OTHER PUBLICATIONS

Advisory Action Before the Filing of an Appeal Brief dated Nov. 30, 2016 From the US Patent and Trademark Office Re. U.S. Appl. No. 14/201,870. (4 pages).

(Continued)

*Primary Examiner* — Harun Chowdhury

(57) ABSTRACT

Rerouting apparatus for rerouting data including multimedia data. The apparatus is for association with electronic equipment and allows for routing the data to a device regarded as the most convenient for playing the media. The apparatus comprises an announcer device for indicating to surrounding equipment that associated equipment is available for rerouting, thereby to enable receipt of rerouted communications therefrom, and a scout device for scanning surroundings of the associated equipment to find out about compatible equipment in the vicinity, thereby to reroute communications thereto. The apparatus may be attached to any device having data processing capability, to enable rerouting of data and communications therebetween.

20 Claims, 1 Drawing Sheet

Figure 1:
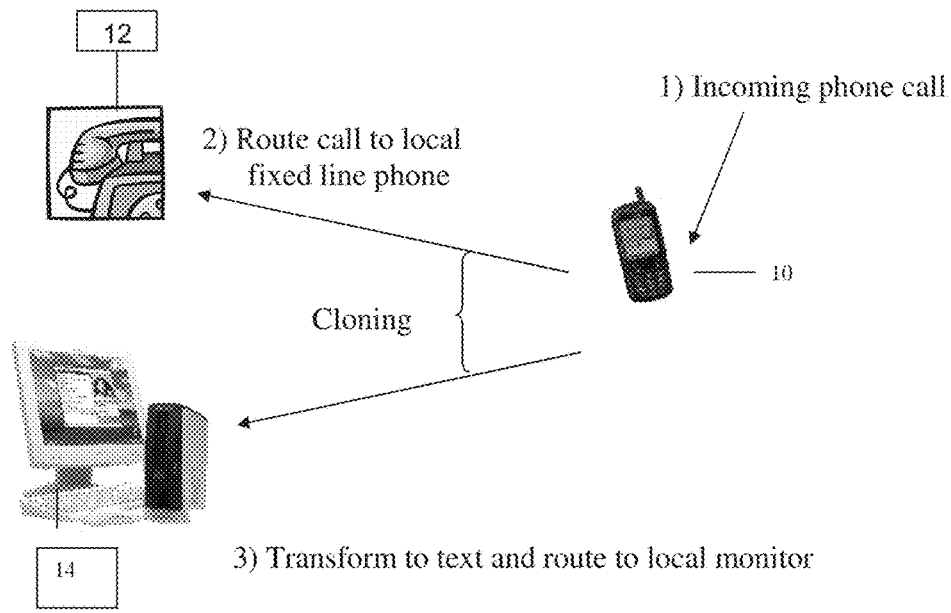

Related U.S. Application Data continuation of application No. 13/118,503, filed on May 30, 2011, now Pat. No. 8,711,866, which is a continuation of application No. 10/347,388, filed on Jan. 21, 2003, now Pat. No. 7,969,990.

(60) Provisional application No. 60/398,077, filed on Jul. 25, 2002.

(51) Int. Cl.
  *H04L 29/08* (2006.01)
  *H04M 3/54* (2006.01)

(52) U.S. Cl.
  CPC ............ *H04L 67/04* (2013.01); *H04L 67/303* (2013.01); *H04M 3/42263* (2013.01); *H04M 3/543* (2013.01); *H04M 2201/60* (2013.01); *H04M 2203/1091* (2013.01); *H04M 2203/2066* (2013.01); *H04M 2203/2094* (2013.01); *H04M 2242/30* (2013.01)

(58) Field of Classification Search
  CPC .... H04M 1/68; H04M 1/725; H04M 1/72502; H04M 3/56; H04M 3/543; H04W 12/02
  USPC ...... 370/335, 342, 338, 466; 455/41.1, 41.2, 455/41.3, 446, 412.1
  See application file for complete search history.

(56) References Cited

U.S. PATENT DOCUMENTS

| | | | |
|---|---|---|---|
| 6,134,433 A | 10/2000 | Joong et al. | |
| 6,144,671 A | 11/2000 | Perinpanathan et al. | |
| 6,333,919 B2 | 12/2001 | Gaffney | |
| 6,405,027 B1 * | 6/2002 | Bell | H04M 1/725 455/41.3 |
| 6,470,180 B1 * | 10/2002 | Kotzin | H04L 67/04 455/412.1 |
| 6,594,699 B1 | 7/2003 | Sahai et al. | |
| 6,961,559 B1 | 11/2005 | Chow et al. | |
| 6,961,754 B2 | 11/2005 | Christopoulos et al. | |
| 7,340,214 B1 * | 3/2008 | Hamberg | H04L 29/06027 370/238 |
| 7,969,990 B2 | 6/2011 | Shmueli et al. | |
| 8,711,866 B2 | 4/2014 | Shmueli et al. | |
| 2001/0005864 A1 * | 6/2001 | Mousseau | H04L 67/16 719/318 |
| 2002/0058499 A1 | 5/2002 | Ortiz | |
| 2002/0132582 A1 * | 9/2002 | Mooney | H04M 1/006 455/41.2 |
| 2002/0133545 A1 | 9/2002 | Fano et al. | |
| 2002/0161862 A1 | 10/2002 | Horvitz | |
| 2002/0183005 A1 * | 12/2002 | Yl | H04L 63/0428 455/41.1 |
| 2003/0073412 A1 | 4/2003 | Meade, II | |
| 2003/0172121 A1 | 9/2003 | Evans et al. | |
| 2004/0017788 A1 | 1/2004 | Shmueli et al. | |
| 2004/0080779 A1 | 4/2004 | Kawamoto | |
| 2006/0013254 A1 | 1/2006 | Shmueli et al. | |
| 2007/0285504 A1 | 12/2007 | Hesse | |
| 2008/0043693 A1 | 2/2008 | Mousseau et al. | |
| 2009/0055707 A1 | 2/2009 | Proctor, Jr. | |
| 2014/0189149 A1 | 7/2014 | Shmueli et al. | |

OTHER PUBLICATIONS

Applicant-Initiated Interview Summary dated Oct. 19, 2016 From the US Patent and Trademark Office Re. U.S. Appl. No. 14/201,870.
Official Action dated Nov. 4, 2013 From the US Patent and Trademark Office Re. U.S. Appl. No. 13/118,503.
Official Action dated Jul. 5, 2007 From the US Patent and Trademark Office Re.: U.S. Appl. No. 10/347,388.
Official Action dated Jul. 7, 2010 From the US Patent and Trademark Office Re.: U.S. Appl. No. 10/347,388.
Official Action dated Jun. 9, 2009 From the US Patent and Trademark Office Re.: U.S. Appl. No. 10/347,388.
Official Action dated Mar. 9, 2016 From the US Patent and Trademark Office Re. U.S. Appl. No. 14/201,870.
Official Action dated Aug. 11, 2016 From the US Patent and Trademark Office Re. U.S. Appl. No. 14/201,870.
Official Action dated Apr. 17, 2008 From the US Patent and Trademark Office Re.: U.S. Appl. No. 11/146,130.
Official Action dated Dec. 23, 2009 From the US Patent and Trademark Office Re.: U.S. Appl. No. 10/347,388.
Official Action dated Mar. 23, 2016 From the US Patent and Trademark Office Re. U.S. Appl. No. 14/201,870.
Official Action dated Apr. 25, 2013 From the US Patent and Trademark Office Re. U.S. Appl. No. 13/118,503.
Official Action dated Oct. 27, 2008 From the US Patent and Trademark Office Re.: U.S. Appl. No. 10/347,388.
Official Action dated Oct. 27, 2008 From the US Patent Office Re.: U.S. Appl. No. 10/347,388.
Official Action dated Dec. 28, 2007 From the US Patent and Trademark Office Re.: U.S. Appl. No. 10/347,388.
Official Action dated Dec. 28, 2007 From the US Patent Office Re.: U.S. Appl. No. 10/347,388.
Van Thanh et al. "The Device Management Service", 2001 IEEE Intelligent Network Workshop, p. 199-211, May 6, 2001.

* cited by examiner

ROUTING OF DATA INCLUDING MULTIMEDIA BETWEEN ELECTRONIC DEVICES

RELATED APPLICATIONS

This application is a continuation of U.S. patent application Ser. No. 14/201,870 filed on Mar. 9, 2014, which is a continuation of U.S. patent application Ser. No. 13/118,503 filed on May 30, 2011, now U.S. Pat. No. 8,711,866, which is a continuation of U.S. patent application Ser. No. 10/347,388 filed on Jan. 21, 2003, now U.S. Pat. No. 7,969,990, which claims the benefit of priority of U.S. Provisional Patent Application No. 60/398,077 filed on Jul. 25, 2002. The contents of the above Applications are incorporated herein by reference.

FIELD AND BACKGROUND OF THE INVENTION

The present invention relates to routing of data including multimedia between electronic devices, and more particularly but not exclusively to rerouting of incoming communications that may or may not include multimedia to devices other than the initial receiving device. Data may arrive from external sources via communication or generated by, or at, a device. Data may be a package or a stream. Such a stream may be unidirectional, bi-directional or multidirectional.

With the introduction of mobile communication devices, telecommunications technology has transformed society over the past decade. The ability to communicate almost anywhere, anytime, with few geographical limitations has resulted in a society, in both social and business contexts, which is almost always on-line. Mobile communication devices today typically have data processing ability which allows them to handle multi-media, and different types of devices are today able to communicate with each other, either directly via a permanent or temporary link or indirectly via a network. Thus data, including multimedia, can be directed or routed from one device to another device. The idea of multi-media routing stems from the myriad of opportunities which present themselves in routing signals from one device or kind of device to another. However, in general, the playing of multimedia data is limited, at least in the short term, to the device on which it is received, or to those in which the data originates. This limitation can be a considerable limitation on the user's ability to enjoy the multimedia since different devices have very different capabilities regarding the playing of multimedia.

The media playing devices considered specifically in the present disclosure include both mobile devices (cell phones, PDA's, handheld devices, etc.) and non-mobile devices (land/fixed line phones, computer monitors, Hi-Fi sets, speakers, etc.). Some of the devices may be used for just one or two media types and others are more general in their applicability, which is to say it is possible to use the devices in different modes for playing several media types: voice, text, images, and video. Likewise, the devices are used in various locations: at the office, home, car, hotel room, plane, outdoors, etc.

Most current mobile devices in particular provide relatively poor multi-media capabilities including digital audio, image, and/or video capabilities (as well as other media capabilities) in comparison with other existing devices such as land/fixed line phones, computer monitors, TV screens and Hi-Fi sets. Compared to high quality media playing equipment, even 3rd generation mobile devices (3G) are of inferior quality.

A number of patent applications discuss rerouting of communications from one communication unit to another. An example is GB 2,370,451, which discloses a communication unit that detects the presence in its vicinity of a second communication unit and determines its identity. If the identity is found to be of a predetermined set (e.g. of communication units having the same owner) calls made to the second communication unit are diverted to the first unit. The arrangement is useful where a user has multiple communication units, for example a car telephone and a cellular handset, with differing telephone numbers as the user may be contacted using any of these.

WO0141317A3: call diversion system, discloses a system specifically for redirecting calls between satellite and terrestrial cellular systems. The disclosure addresses the issue of reformatting data messages for the transition.

Neither of the above systems takes into consideration the types of multimedia content of the incoming calls data or playing quality and usage comfort when deciding whether to redirect, and redirection is based on devices having a shared ownership or otherwise being part of a predetermined set. In the above-described systems the user typically has only limited control over rerouting. Nevertheless, it would be highly advantageous to provide the user with the ability to select a target device, based on the type of multimedia content, and furthermore to choose a device for play or storage of the content independently of the initially targeted or originating device.

SUMMARY OF THE INVENTION

According to a first aspect of the present invention there is thus provided data rerouting apparatus for association with electronic equipment for rerouting data, comprising:

an announcer device for indicating to surrounding equipment that said associated equipment is available for rerouting, thereby to enable receipt of rerouted data therefrom, and a scout device for scanning surroundings of said associated equipment to find out about compatible equipment in the vicinity, thereby to reroute data thereto.

The apparatus preferably further comprises a user interface associated with said scout device for allowing a user to select between available compatible equipment to reroute data thereto.

Preferably, said scout device is operable to determine media type requirements of said compatible equipment, the apparatus further comprising a media transformer, associated with said scout device, for transforming media into a form that accords with said determined media type requirements.

Preferably, a plurality of types correspond to said media type requirements, and further comprising a user interface for allowing a user to select one of said media type requirements for transforming at said media transformer.

The apparatus preferably further comprises a media cloner for making multiple copies of the data, in particular but not exclusively an incoming communication, thereby to enable said apparatus to redirect, for example, a single incoming communication to a plurality of locations.

Preferably, said announcer is an active device, operable to transmit at least status information to respective surroundings.

Preferably, said announcer comprises a passive device, carrying at least device identification information for reading by an active scout device.

Preferably, said passive device further carries status information of said device.

Preferably, said announcer comprises a barcode and wherein said scout is a barcode reader.

The apparatus preferably further comprises an outgoing multimedia transmitter for directing rerouted media directly to a selected device.

The apparatus preferably further comprises control functionality operable to inform a communication service provider of a desired rerouting, thereby to enable said communication service provider to reroute said data.

The apparatus preferably comprises control functionality operable to carry out said rerouting directly.

The apparatus preferably comprises control functionality operable to carry out said rerouting through locally available network infrastructure.

The apparatus preferably comprises a device database for storing compatibility data of different equipment types.

According to a second aspect of the present invention there is provided a method of rerouting data comprising:

Receiving or generating said data at a first device, determining availability of other devices in the vicinity of said first device, and rerouting said data to at least one target device selected from devices found to be available.

The method preferably comprises determining compatibility of said available devices in said vicinity with said communication.

The method preferably further comprises carrying out media type transformation from a media type of said data to a media type compatible with a selected device.

The method preferably further comprises carrying out selection between devices found to be available, via a user interface.

The method preferably further comprises carrying out a selection between devices found to be available, based on a predetermined user profile.

The method preferably further comprises selecting a plurality of devices to reroute said data thereto, and cloning said data for each selected device.

The method preferably further comprises determining availability of other devices in the vicinity of said target device, and rerouting said data to at least one further target device selected from devices found to be available.

According to a third aspect of the present invention there is provided a data rerouting apparatus for association with electronic equipment for rerouting data to at least one selected target device, comprising:

a cloner for making multiple copies of incoming data, thereby to enable said apparatus to redirect single incoming data to a plurality of respective target devices, and a transformer, associated with said cloner, for receiving at least one of said multiple copies of said incoming data, and transforming said data into a form that accords with a determined media type requirement of a respective target device.

BRIEF DESCRIPTION OF THE SEVERAL
VIEWS OF THE DRAWINGS

For a better understanding of the invention and to show how the same may be carried into effect, reference will now be made, purely by way of example, to the accompanying drawings.

Figure 2:
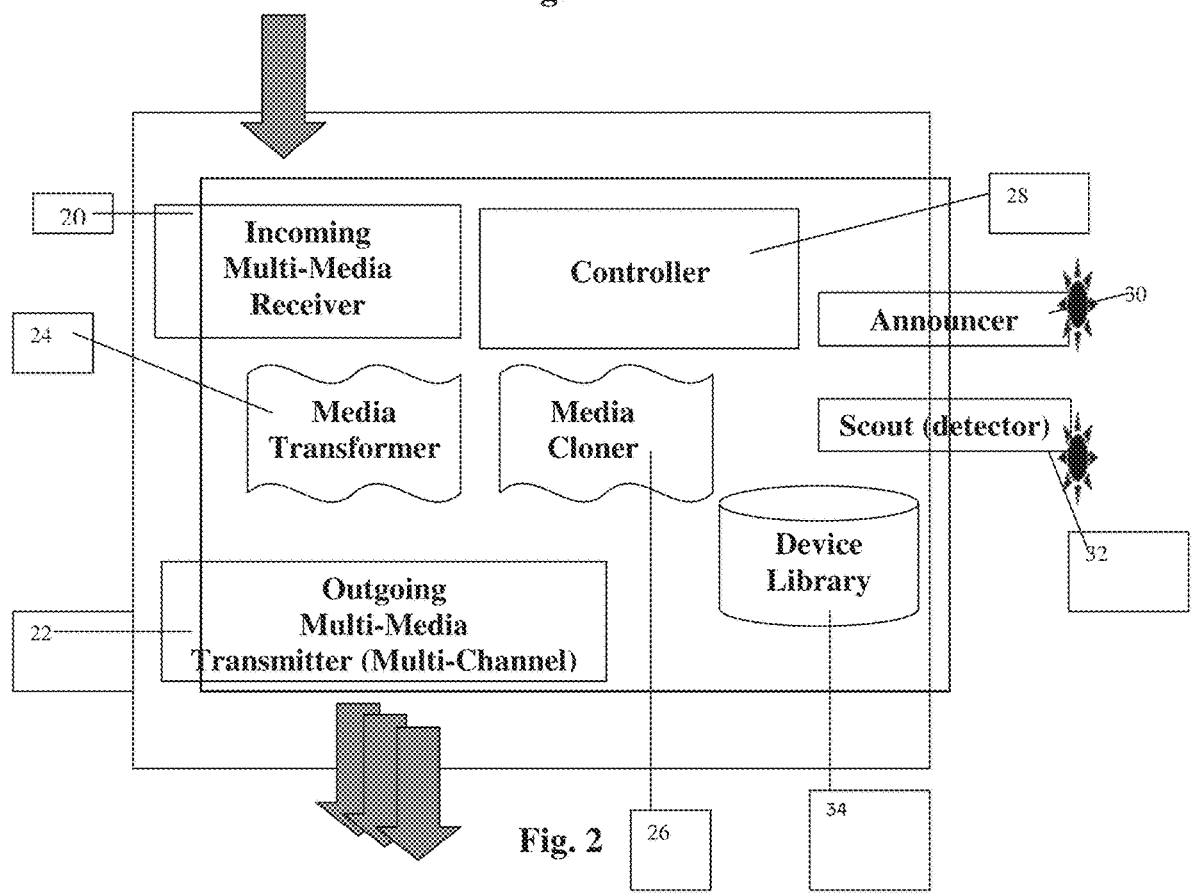

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 is a simplified diagram showing a plurality of electronic devices in the vicinity of one another, between which communications can be rerouted according to a preferred embodiment of the present invention, and FIG. 2 is a simplified block diagram showing a preferred apparatus for attachment to an electronic device for allowing the device to support rerouting according to preferred embodiments of the present invention.

DESCRIPTION OF THE PREFERRED
EMBODIMENTS OF THE INVENTION

The capability of routing of multi-media content (possibly including media transformation and multiplication, i.e. cloning) from one device to another may dramatically upgrade media playing quality, and grant the user the liberty to play the content on any device he wishes, preferably the most suitable device available, regardless of the origin of the content or the device to which the content may initially have been directed, or at which the content originates. Furthermore, by rerouting to a more capable device, a user's satisfaction level may be increased in comparison to having to remain with a device that say is limited by inferior data rate, processing power, memory capacity or input/output facilities. For example, a cellular communication device such as a mobile telephone is such a limited capability device which is typically the initial recipient of a communication. Such an initial recipient, or originator, is referred to hereinafter as the routing-source device. Furthermore, as will be explained below, the ability to route content from non-mobile, that is land or fixed devices to nearby mobile and other devices permits a range of possibilities for use which is currently not provided for.

For example, the ability to route an incoming phone call, typically comprising voice, from a mobile device to a land/fixed line phone may generally be expected to upgrade the quality of the call. The ability to route hand held calendar content from a mobile device having some digital ability to a computer monitor, may allow for better viewing of the information. Such rerouting may also enhance the user's ability to share the information with other people or with computer applications, for example applications that capture information displayed on the monitor and use it to trigger other events. Such applications can easily be run on a PC or laptop computer but are difficult to run on a mobile telephone for example.

An incoming call or other originating data may be rerouted more than once. In preferred embodiments, individual devices do not need to know whether they are an initial receiving device or a first or subsequent rerouting device, and may treat any arriving communication in the same way.

Furthermore, a preferred embodiment of the present invention provides an ability to route an incoming voice message from say a mobile device or voice mailbox to a facsimile machine or display monitor, combined with a transformation capability—in this case an ability to transform voice to text. Software packages that interpret voice and translate into text are well known and commercially available. Such packages, which presently require training on a specific voice in order to produce reasonable results, may broaden the usage of voice messages. However, even without training, the best packages can produce sufficiently good results to enable say the hard of hearing to make a reasonable interpretation of an incoming voice signal. Thus such a rerouting-while-transforming capability may be highly desirable for people with special needs—impaired senses (hearing, vision) who may use such a capability to receive information in a form more usable to them. Likewise such a capability may be useful for receiving communications in difficult environments such as a noisy factory floor.

As a further example, an incoming phone call directed at a land/fixed line may be rerouted to a mobile device, thus, effectively using the mobile as a cordless phone. Such a technique may ease acceptance of a phone call in a hotel lobby, at a colleague's office, at a restaurant and in many other settings.

Routing an incoming call away from a mobile telephone may also be advantageous health-wise in decreasing the physical proximity of electromagnetic radiation (emitted by mobile devices) to the user.

It is pointed out that communication-enabled devices can receive an incoming communication for rerouting. However as long as rerouting is direct from device to device, the device to which the rerouting is made need not be generally enabled for external communication as typically managed by a service provider be it phone, cellular, internet and the like. Furthermore, routing is not limited to rerouting of incoming communications but also applies to routing of data from any kind of data source to any kind of data player. Data may arrive from external sources via communication or generated by, or at, a device. Data may be a package or a stream. Such a stream may be unidirectional, bi-directional or multidirectional. Thus video data being captured at a video camera may be directed using embodiments of the present invention to a convenient nearby video player or multimedia enabled PC. Thus, a generally non-communication enabled device will be unable to receive initial communications but can route data to other devices and can receive data as a rerouting target.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified schematic diagram showing a cellular telephone 10 in proximity to a fixed telephone 12 and a computer monitor 14. The three electronic devices need have no relationship to each other except that of proximity. An incoming call is received at cellular telephone 10. As will be explained below, the cellular telephone 10 detects the presence of the other devices 12 and 14 and allows the user to retain the call at the cellular telephone 10 or alternatively to transfer it to either of the other devices 12 and 14. If the user chooses the fixed telephone 12 then the call is rerouted in one of a number of ways explained below to the fixed telephone 12 where the call may be taken in the usual way. If the user chooses the computer monitor 14 then assuming the presence of speakers and a microphone the call may be taken again in the normal way. In addition, software may be provided, either at the cellular telephone 10 or at the computer 14 to convert the voice signal into text.

It is noted that in the case of a cellular telephone, the telephone communication is a bi-directional type of communication, and any rerouting should preferably support a return path for the communication.

In addition, using the above rerouting, a call can be set up to support a game session. The call can be set up using a cellular telephone, and then one or both users reroutes the call to a game console.

The above may be achieved by sending rerouting control data along with the rerouted communication, which control data includes a return address. The return address may be a final return address for single stage rerouting, or may be an intermediated return address in the case of multi-stage rerouting. In the latter case, the intermediate return address can be used in an intermediate rerouting device to find a further rerouting address.

Reference is now made to FIG. 2, which is a simplified block diagram showing in schematic form the elements of a modification to be applied to a communication device for use in call rerouting of the kind described in FIG. 1. It will be appreciated that the elements are not restricted to a cellular telephone but may be applicable to any electronic device and more particularly but not exclusively to communication-enabled devices. Depending on the device type, some functionality may be disabled. For example, a land/fixed line phone might not need an outgoing multi-channel multi-media transmitter component. A device not enabled for external communication may not be able to receive originating communications from an external communication network but may be able to route data to other devices and be the target for data and communication rerouting.

The device comprises an incoming multi-media receiver 20 which is responsible for capturing media content and passing it to one of the other components in the device, depending on the circumstances, as will be explained below. One of these other components is outgoing multi-channel multi-media transmitter 22. Transmitter 22 is responsible for transmitting (directly) media streams to external devices which are specified to it. Transmitter 22 comprises a multi-channel port which is able to transmit several media types to several devices at the same time.

A media transformer 24 is responsible for transforming its input (incoming media) into a required media type, or types, and outputting the resulting media stream(s), or file(s). It too preferably has a multi-channel Output. The media types required as output are preferably specified externally. A preferred embodiment of a media transformer includes a voice to text transformer as discussed above. The voice to text transformer may be augmented by a text to fax transformer. Further transformations include image transformations such as color to black and white, resolution reductions, and image format transformations. Similar transformations may be provided for video, and to the extent applicable for sound formats.

Media cloner 26 is responsible for duplication of its input channel content, preferably received from the incoming multi-media receiver 20 (input media) into as many output channels as indicated to it externally. Each output stream, or file, is routed, as indicated to it externally, to either the media transformer 24 or the outgoing multi-media transmitter 22.

Controller 28 is responsible for managing all the other components and monitoring their activities. In particular, any media (packaged or streamed) transfer between components, input and output, is performed under the controller's supervision.

In operation, content is received at incoming multimedia receiver 20. As will be explained in detail below, one or more destinations for the data as well as media type transformations are selected. In the case of straightforward rerouting of the media to another device, the content is sent directly to outgoing multi-media transmitter 22 for simple media routing to a similar content type device. In other circumstances, transforming from one media to another may be required prior to rerouting. In such a case, content is directed to media transformer 24 prior to rerouting, where transforming is carried out. The transformed content is then directed to the outgoing multi-media transmitter 22 as before. Content is directed to media cloner 26 in cases where it is intended to route the content to more than one device, or if for any reason it is intended to send multiple copies to the same device. From the media cloner the content may then be sent directly to the outgoing multi-media transmitter 22 for direct output, or one or more of the copies may be sent to the media transformer for transformation prior to output. Routing of the content and operation of the above-mentioned components is preferably controlled by controller 28.

In order to make decisions about selecting destinations and media types and in order to allow other devices to receive availability information, three more components are preferably provided, an announcer device 30, a scout device 32 and a device library 34.

The announcer device 30 is responsible for announcing to the environment the availability of a current device for accepting routed media. It may also indicate device type and use conditions, preferably including any usage charges, thus enabling surrounding devices to avoid say sending video data to a fax machine, or enabling security conscious users to avoid receiving non-trusted data at their device. When the device becomes busy (for example, a phone that is handling a call), it announces this to the environment, typically via transmissions. Similarly, it announces its becoming available. Announcements may be periodically repeated. As an alternative the announcer device 30 may signal only when available or only when unavailable. Another (optional) function of the announcer 30 is that of informing the environment, typically a user, that media content has been routed to it and is now usable (for example, to announce that a rerouted call is now available on this telephone). The latter kind of announcement, that is to say to persons rather than to electronic equipment, may typically comprise light flashes, rings, a loudspeaker sound or even a smell.

Typically, the announcer device 30 may be active (transmitting) or passive (reacting, or reflecting). A simple example of a passive announcer device is a sticker attached to a phone and supplying say device type and conditions of use information using a barcode. The sticker may be scanned and comprehended by the scout devices 32. In addition to a sticker, a passive announcer may be provided using an LCD screen displaying a barcode. The LCD or like screen is advantageous in that, since its display can change, the barcode can indicate current status information. An alternative way of providing status information along with a barcode is by providing a color display alongside the barcode. The color display may be changed electronically or mechanically by the device to indicate different states, and can be read optically along with the barcode.

The scout device 32 is responsible for scanning the environment to find other devices therein and to determine their status, typically free or busy. The scout is also responsible for obtaining any specific use conditions from announcers 30 of the devices being detected. The scout may be activated periodically and/or upon demand.

Device library 34 contains information needed for communicating with various devices. Such information may typically include usage related information as well as technical information regarding expected media formats and transmission technology specifications, including protocols, used by the device type. It may also contains pre-defined user preferences if defined, including default user preferences.

The controller 28 is responsible for integrating knowledge accumulated by the scout, and for directing operation of the announcer 30. The controller uses either pre-defined user preferences from the device library 34 or it may obtain preferences over a network, or it may simply capture user preferences using menus or like user interaction. The controller preferably follows the appropriate receiving/transmitting protocol including hand shake, identification, authentication, encryption procedures and the like.

The apparatus described in respect of FIG. 2 may be physically packaged, for example as a card, a chip or an attached stand-alone unit. The apparatus may also be realized as software within another apparatus, host device—for example, on a personal computer (PC), cell phone, a personal digital assistant (PDA) or other standard electronic devices. In any case, the host apparatus preferably possesses its own transmission and receiving capabilities, or is connected, perhaps via a network, to another device that does have such capabilities.

For example, a host cellular telephone may use already installed IR for scouting and announcing or any of the previously described technologies. A PC may use an existing peripheral digital camera for scouting and local network devices for transmission.

In many situations, as briefly described in previous examples, certain apparatus activities may be initiated via user interaction, and preferred ways of enabling user interaction comprise displaying menus, or using voice menus, or conceivably even using feel or smell menus. Certain actions are preferably taken automatically, that is to say without user interaction. Such automation may be based on profiles, terms, and conditions. Conditions may for example be associated with the device that performs the routing, as well as with a device to which media is routed. Profiles may be stored with the modification apparatus of FIG. 2 or obtained from remote sources.

Menus may be activated in the following modes:

a) Automatic pop-up menu upon event (incoming call, message etc.)

b) Manual (menu) activation ("always on".)

To protect against hostile or non-trusted parties, the modification preferably provides some level of firewall protection for both receiving and transmitting components. Such protection may comprise identification and/or authentication, and may comprise restrictions on routing or receiving information to devices whose owners are not trusted. In addition, to protect privacy, transmitted information may be encrypted.

Considering the outgoing multi-media transmitter 22 in greater detail, the transmitter may incorporate one or more of the following transmission technologies for transmitting media to a nearby device:

Infra-red (IR)
Microwave
Radio (any suitable frequency)
Sound waves
Ultrasound
Wire (and cable) transmission technologies
Light (visible)
Laser
Chemical (mainly smell)
Quantum techniques
and other technologies that will occur to the skilled person. The choice of technology may depend on general and specific circumstances, such as the type of data to be transmitted, the environment of the transmission, safety and like considerations, and compatibility with as many as possible other devices.

As described above, rerouting may be direct, that is device to device. Direct (local) routing between devices uses one or more of the technologies specified above but does not usually use any external service provider services, network, or infrastructure. Such routing may however use a local computer network, for example cable or radio-based, or simple end-to-end communication (for example, IR communication between two or more devices).

In addition, rerouting may be indirect. Indirect non-local routing relies on external service provider services, network and infrastructure. Indirect routing still requires the device initially receiving the communication to detect available receiving devices and determine their capability and availability and also requires potential rerouting recipients to announce their capabilities to the environment. The device initially receiving the communication then makes a decision, typically with the help of user interaction, to determine whether to reroute the message and if so to what device, just as before. However the rerouting information is then sent to the external provider who carries out the rerouting of the communication by switching at the exchange. Such a switching method can take advantage of higher data rates over land lines as opposed to wireless connections.

A third rerouting mode uses local network infrastructure to carry out the rerouting. The communication is routed through a local area network (LAN), or a wide area network (WAN) infrastructure with information to indicate to the network which device has been selected for rerouting. However the network has to interpret the information to decide how to route the information. Either kind of rerouting through the available network infrastructure may be useful, for example for rerouting of an incoming phone call from a cellular telephone to a colleague in another room within the same organization.

There are many ways to exploit the capability to route different content (media) types between different devices. Using only rerouting, one may route one form of content (for example audio) only to devices that handle audio (for example, routing an audio stream to nearby speakers). Using rerouting combined with a media type transformation capability, one may route content transformed specifically for a receiving device. Thus for example voice may be transformed into text and then routed to a fax machine. It may also be possible to transform color images to smell and reroute them to a device able to output smell. Finally, cloning allows the same content to be sent to several devices, and combinations of different transformations for different devices may allow additional dimensions to incoming multi-media. Thus, for example an incoming signal comprising music and voice could be cloned. One of the clones could be transformed into text and transmitted to a monitor able to display text. The other clone could be transmitted to speakers to give high quality reproduction of the music. As a further variation, if the incoming music signal is initially directed at a mobile device, it could first of all be rerouted at the service provider level to a land device so as to support a better data rate and then cloned and redirected for text output as described above. Thus high quality audio play of the music can be combined with a display of the words of the song.

The list below describes typical device/media type combinations for rerouting capability. It is noted that not all the devices are typical external-communication-enabled devices. As mentioned above, non-external-communication enabled devices may not receive original incoming communications but they can route data to other devices and receive data as rerouting targets.

1. Audio and Voice

Audio, and voice type media may be routed from devices including cellular telephones and other cellular or mobile devices including voice enabled PDA's, two-way radios etc., land or fixed line telephones, voice mail boxes (voice messages), Hi-Fi sets, both mobile and non-mobile including radio receivers, MP3 players, Cassette, CD, DVD and VCR players, and the like, and TV sets.

Audio and voice-type media may typically be routed to land or fixed line telephones, cellular telephones and like cellular mobile devices, Hi-Fi sets (mobile and non mobile), car audio systems, TV sets, speakers, and LAN/WAN servers and like infrastructure.

2. Video

Video media may be routed from cellular telephones, especially 2.5G and 3G devices, and other similar hand held devices, DVD and VCR players—both mobile and non-mobile, video cameras and recorders, monitors (screens) including those of TV sets, computer monitors, etc. mobile game devices (for example: Game boy), unified messaging mail boxes, road signs and digital advertisement boards, and LAN/WAN servers and like infrastructure.

Video media may typically be routed to cellular telephones and especially 2.5G and 3G devices, other cellular hand held devices, monitors (screens) including those of TV sets, computer monitors, etc. DVD and VCR players—including both mobile and non-mobile devices, video cameras and recorders, mobile game devices (for example: Game boy), unified messaging mail boxes, road signs and digital advertisement boards, and LAN/WAN servers and like infrastructure etc.

3. Text

Text type data may be routed from cellular telephones where they may be in the form of SMS, email messages and the like, other hand-held devices, unified messaging mail boxes, electronic books, standard computers, and the like.

Such text type data may be routed to monitors (screens)—including TV sets, computer screens, etc. printers, facsimile machines, cellular telephones and other hand held devices, unified messaging mail boxes and LAN/WAN servers and like infrastructure, etc.

4. Images

Image data may typically be routed from digital cameras, facsimile machines, monitors (screens) including TV sets, computer screens, etc., digital vision-oriented equipment such as microscopes, telescopes, binoculars, etc.

Such image data may be routed to cellular telephones, especially 2.5G and 3G devices, other hand held devices, monitors (screens)—including TV sets, computer screens, etc. digital cameras, facsimile machines, printers, unified messaging mail boxes, and LAN/WAN servers and like infrastructure.

As stated earlier, combining the routing capability with the media transformation capability in principle enables routing of any media between any pair of devices appearing in the lists above. Furthermore, combined with cloning, media may be used in different ways at different devices. Such different ways may even be carried out concurrently, thus enabling the simultaneous routing of any media type to any number of devices.

The following is a series of procedure flows for different scenarios.

In the scenarios, appropriate combinations of Routing, Transforming and Cloning an incoming communication are selected to fit the circumstances.

Scenario 1

1. A person carrying a mobile phone enters his colleague's office
2. In the office there are a land/fixed line phone and a computer screen (monitor)
3. An incoming phone call arrives at the person's cell phone
4. The cell phone detects the said land/fixed line phone and monitor
5. A pop up menu appears on the cell phone display and after the person acknowledges, the phone call is routed to the land/fixed line phone
6. The land/fixed line phone flashes to indicate an incoming call
7. The person receives the call on the land/fixed line phone
8. The person wishes his colleague to be aware of what's being said on the other side of the line
9. He activates a menu on the cell phone display and chooses the "Clone to Monitor" option
10. The monitor shows the conversation text as it is carried out, enabling the colleague to monitor the conversation's content in text form Scenario 2

This scenario is similar to scenario A. The difference is:
The phone call is automatically routed to the land/fixed line phone (based on the person's preferences and environment scanning and detection)

Scenario 3

1. A person, say Smith, carrying a cell phone is sitting in a hotel lobby
2. In the lobby there are four land/fixed line phones
3. A phone call arrives at the person's cell phone
4. Option A:
   a. The person points his phone at one of the land/fixed line phones
   b. The cell phone detects the said phone as busy
   c. The person points his phone at another land/fixed line phones
   d. The phone call is routed to that, available, land/fixed phone
   e. The chosen land/fixed phone rings, or flashes to indicate the rerouted call
5. Option B:
   a. While ringing, the cell phone indicates on its display that a nearby phone is available
   b. The person approves the routing of the call to that nearby phone
   c. The nearby phone rings, or flashes to indicate the rerouted call
6. Option C:
   a. The call is automatically routed to an available nearby phone
   b. The person is notified of the routing on the cell phone display
   c. In parallel, the nearby phone uses a loudspeaker to announce the call by calling out Smith's name
   d. The nearby phone rings, or flashes to indicate the rerouted call
7. The person receives the call on the available/chosen land/fixed line phone Scenario 4

1. A hearing impaired person carrying a cell phone enters his colleague's office
2. In the office there are a land/fixed line phone and a computer screen (monitor)
3. An incoming phone call arrives at the colleague's land (fixed) line phone
4. The colleague receives the call and at some point wishes his friend (the hearing impaired person) to participate in the conversation
5. The colleague then clones the voice conversation to both:
   i) His monitor (the voice is then transformed to text and appears, as it is spoken, on the monitor)
   ii) The hearing impaired person's cell phone
6. The hearing impaired person "hears" the conversation by reading the text appearing on the monitor
7. The hearing impaired person speaks to his cell phone microphone and can thereby participate in the conversation It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. A method of informing a device about an availability of media content at a mobile device connected to a local area network (LAN), comprising:
   using the mobile device for:
   identifying one or more available devices compatible to handle the media content and connected to the LAN;
   wirelessly communicating information to an intermediate routing device connected to the LAN for indirectly routing messages or media content to at least one of the one or more available devices via said intermediate routing device; and wirelessly signaling the one or more available devices indicating an availability of a media content at the mobile device;

wherein the media content is originated from an external source disconnected from the LAN;

wherein the media content selected from a group consisting of: audio content and video content.

2. The method of claim 1, wherein said one or more available devices are identified from pre-defined user preferences.

3. The method of claim 2, wherein said pre-defined user preferences are made on the mobile device.

4. The method of claim 1, wherein said wirelessly connecting is done automatically.

5. The method of claim 1, wherein the media content is a phone call; further comprising routing the phone call to the one or more available devices in response to a receipt of a response to the signaling received from the one or more device.

6. The method of claim 1, wherein the media content is a phone call; further comprising routing the phone call to the one or more available devices while the phone call is ongoing using the mobile device.

7. The method of claim 1, wherein the one or more available devices is triggered by the signaling to perform one or more of the following: flash light, ring, and play a loudspeaker sound.

8. The method of claim 1, further comprising setting up a wireless communication link between the at least one of the one or more available devices based on a user interaction made with the mobile device or the one or more available devices and causing a routing of the media content to the at least one device via the wireless communication link.

9. The method of claim 8, wherein the wireless communication link is a direct communication link.

10. The method of claim 1, wherein the identifying comprises triggering a display of a menu by the one or more available devices or the mobile device to allow a user to perform a user interaction.

11. The method of claim 1, wherein the one or more available devices are triggered by the signaling to inform a user about an availability of media content at the mobile device.

12. The method of claim 8, wherein the setting up is performed using data describing the one or more available devices which is extracted from a device library of the mobile device, the data includes technical information regarding expected media formats and transmission technology specification of the selected device.

13. The method of claim 1, further comprising encrypting and routing the media content to the one or more available devices.

14. The method of claim 1, further comprising routing of the media content directly from the external source to the one or more available devices.

15. A mobile apparatus for informing a device about an availability of media content, comprising:

a receiver adapted to receive wirelessly, from an external source, media content selected from a group consisting of: audio content and video content; and a controller adapted to identify one or more available devices connected to a local area network (LAN) and compatible to handle the media content;

wherein the controller is adapted to instruct communicating wirelessly information to an intermediate routing device connected to the LAN for indirectly routing messages or media content to at least one of the one or more available devices via said intermediate routing device;

wherein the controller is adapted to wirelessly signaling the one or more available devices indicating an availability of the media content at the mobile device;

wherein the media content is originated from an external source disconnected from the LAN.

16. The mobile apparatus of claim 15, wherein the one or more available devices is triggered by the mobile device to perform one or more of the following: flash light, ring, and play a loudspeaker sound.

17. The mobile apparatus of claim 15, further comprising a user interface for allowing a user to select between the one or more available devices.

18. The mobile apparatus of claim 15, wherein the media content is audio content selected from a group consisting of: a phone call data, bidirectional voice data, bidirectional audio data and a radio broadcast.

19. A computer program product for a device for informing a user about an availability of media content at a mobile device, the computer program product comprising:

a non-transitory computer readable storage medium having stored thereon:

first program instructions executable by a processor to wirelessly communicating information to an intermediate routing device connected to a local area network (LAN) for indirectly receive messages or media content routed from one or more available devices connected to the LAN via the intermediate routing device; and second program instructions executable by the processor to wirelessly receive signal from the mobile device indicating an availability of a media content at the mobile device;

third program instructions executable by the processor to inform the user of said device about an availability of a media content at the mobile device with one or more of the following: flash light, ring, and play a loudspeaker sound;

wherein the media content is originated from an external source disconnected from the LAN;

wherein the media content selected from a group consisting of: audio content, text content and video content.

20. The mobile apparatus of claim 15, wherein the media content is video content selected from a group consisting of: bidirectional video data, a game session, an interactive game session, and a television broadcast.

* * * * *